3,567,433
METHOD OF RECOVERING METALS FROM SPENT HYDROREFINING CATALYSTS
George Gutnikov, Los Angeles, Calif., assignor to Universal Oil Products Company, Des Plaines, Ill.
No Drawing. Filed Feb. 14, 1968, Ser. No. 705,285
Int. Cl. C22b 3/00
U.S. Cl. 75—103                                    3 Claims

ABSTRACT OF THE DISCLOSURE

Recovery of metals from a spent metals-laden hydrorefining catalyst. Carbonaceous matter is burned from the spent catalyst which is thereafter extracted with aqueous ammonia or ammonium carbonate solution to recover molybdenum, nickel and vanadium therefrom.

BACKGROUND OF THE INVENTION

One of the more recent developments relating to the conversion of petroleum hydrocarbons to more useful products concerns the upgrading of residual oils by hydrorefining methods. Upgrading in some cases is directed to the conversion of said residual oils to more valuable lower boiling fractions thereof. In other cases, the residual oils are upgraded by treating the same at hydrorefining conditions effecting hydrodesulfurization such that upon subsequent combustion as fuel oils in domestic heaters, industrial furnaces, etc., the sulfurous products discharged into the atmosphere are minimized.

Residual oils refer to the hydrogen deficient hydrocarbonaceous residuum produced as a result of separating lighter fractions from crude petroleum oil. The residual oils are variously referred to as asphaltum oil, liquid asphalt, black oil, petroleum tailings, residuum, residual reduced crude, bunker fuel oil, etc., typically having an initial boiling point in excess of about 400° F. Residual oils are often characterized as heavy oils of which more than about 10 vol. percent boils above 1050° F., and as having an API gravity at 60° F. of less than 20. Sulfur concentrations are exceptionally high—more than 1 wt. percent and often in excess of 3 wt. percent. Conradson Carbon Residue factors exceed 1 wt. percent, and a large portion of the residual oils exhibit a Conradson Carbon Residue factor in excess of 10.

It is generally known that the petroleum crude oils contain varying amounts of metatllic impurities comprising principally nickel and vanadium. Although the metallic impurities may exist in a variety of forms they are generally found as organo-metallic compounds of relatively high molecular weight and include metallic porphyrins and various derivatives thereof. A small portion of the organo-metallic material is distillable and is separated with the lower boiling petroleum fractions in the course of subsequent refining operations. However, a significant quantity of the organo-metallic material is associated with asphaltenic material and, being non-distillable, becomes concentrated in the residual fraction. It is not uncommon to find residual oils containing about 100 p.p.m. vanadium and nickel, calculated as the elemental metal, seldom less than about 35 p.p.m. and, in extreme cases, as much as 2000 p.p.m.

Hydrorefining of residual oils is generally effected at relatively severe conditions including temperatures up to about 1200° F. or more, although temepratures in the range of from about 600° to about 850° F. are more common. Reaction conditions include an imposed hydrogen pressure of from about 100 to about 4000 p.s.i. The hydrocarbon feed stock is generally processed at a liquid hourly space velocity of from about 0.5 to about 20 in a continuous type of operation. Normally the hydrogen is charged together with recycle hydrogen to provide from about 1000 to about 40,000 standard cubic feet per barrel of hydrocarbon charge. Hydrorefining catalysts generally comprise a Group VI–B metal, usually molybdenum, and a Group VIII metal, usually nickel, on a refractory inorganic oxide support, usually a composite of alumina and silica.

It will be appreciated that in the processing of hydrogen deficient hydrocarbonaceous materials such as are described, carbonaceous as well as sulfurous deposits are formed on the catalysts in considerable excess of that normally encountered in the treatment of lighter petroleum fractions. These deposits serve to deactivate the catalyst and eventually must be removed at conditions conducive to catalyst reactivation. The carbonaceous matter is suitably removed by air oxidation and, to all appearances, an active catalyst is recovered. However, due at least in part to the accumulation of metals thereon, each regeneration produces a catalyst somewhat less active than its predecessor and regeneration is required with increasing frequency. In time, regeneration is no longer economically feasible and a fresh catalyst is required.

The catalytic metals initially composited with the catalyst, e.g., molybdenum and nickel, as well as the metals subsequently accumulated thereon, e.g., nickel and vanadium, are of substantial value. In view of this, and in view of the extensive metals accumulation on the spent catalyst, it is highly desirable to recover said metals from the catalyst prior to disposition thereof. In addition to the molybdenum component, spent catalysts frequently comprise in excess of about 6 wt. percent nickel and in excess of about 20 wt. percent vanadium.

It is therefore an object of this invention to present an efficient and inexpensive method for the simultaneous recovery of molybdenum, nickel and vanadium from a metals-laden spent hydrorefining catalyst.

SUMMARY OF THE INVENTION

In one of its broad aspects the present invention embodies a method for the recovery of metals selected from the group consisting of molybdenum, tungsten, nickel, cobalt, and vanadium from a spent catalyst comprising said metals and carbonaceous matter deposited on a refractory inorganic oxide support, which method comprises contacting said catalyst with an oxygen-containing gas at conditions to burn the carbonaceous matter therefrom, thereafter maintaining said catalyst in contact with an aqueous solution of a treating agent selected from the group consisting of ammonia and a soluble ammonium salt of a weak acid at a temperature below the boiling point of said solution, separating said solution and recovering the soluble metal extracted therein. While the method of this invention is operable to recover molybdenum, tungsten, nickel, cobalt and vanadium from a spent hydro-refining catalyst, it finds particular utility in the recovery of the molybdenum, nickel and vanadium commonly found on spent hydrorefining catalysts and the subsequent description of the method of this invention is presented with respect thereto.

In the practice of this invention, the spent catalyst is treated in contact with an oxygen-containing gas at conditions to burn the carbonaceous matter therefrom. Removal of carbonaceous as well as sulfurous matter from deactivated catalysts by heating the same in a fixed bed or a fluidized bed in contact with an oxygen-containing gas is well defined in the art. Thus, the catalyst is heated in contact with oxygen, air or air diluted with nitrogen to control the burning rate.

Catalysts to which the method of this invention is particularly applicable comprise a refractory inorganic oxide base. The refractory inorganic oxide commonly comprises alumina, or alumina composited with another refractory inorganic oxide such as silica, zirconia, thoria, magnesia, titania, zinc oxide and the like. It has been observed, particularly in the case of alumina-based catalysts or those supported on a base comprising alumina, that the subsequent recovery of vanadium together with nickel and molybdenum is facilitated by maintaining the carbon-off temperature at a minimum commensurate with exceptable burn-off rate and not exceeding about 1200° F., preferably not in excess of about 1100° F.

Pursuant to the present method, the spent catalyst, substantially free of carbonaceous and sulfurous matter is maintained in contact with an aqueous solution of a treating agent selected from the group consisting of ammonia and a soluble ammonium salt of a weak acid at a temperature below the boiling point of said solution. Preferably, the treating agent is a soluble ammonium salt of the weak acid, particularly ammonium carbonate, but also including ammonium pentaborate, ammonium peroxyborate, ammonium tetraborate, ammonium cyanate, ammonium carbamate, ammonium formate, ammonium acetate, ammonium propionate, ammonium benzoate, ammonium citrate, ammonium lactate, ammonium oleate, ammonium oxalate, ammonium salicylate, and the like.

The spent metals-laden catalyst is treated in contact with at least one of said treating agents in aqueous solution at conditions to effect maximum contact with the extracting solution. One preferred method relates to a continuous type of operation whereby the spent catalyst is continuously charged to a recovery vessel and processed downwardly therethrough in contact with the treating solution percolated upwardly through the spent catalyst mass and subsequently withdrawn overhead. As an alternative method, the spent catalyst can be immersed in the treating solution for a predetermined time interval, preferably at conditions to maintain a circulation of the treating solution in contact with the spent catalyst.

The bulk or major portion of the metal values, i.e., molybdenum, nickel, and vanadium, is extracted after a relatively brief period of contact, usually less than about one hour. In most instances, substantially all—in excess of about 90% of the molybdenum is extracted. Alumina-based catalysts, or those supported on a base comprising alumina, appear to be more resistant to vanadium and nickel extraction. As heretofore mentioned, vanadium extraction is facilitated by initially limiting the temperature at which the carbonaceous matter is burned from the spent catalyst to less than about 650° C. In any case, nickel and vanadium recoveries in excess of 65–70% are effected within said period of less than about 1 hour although longer contact times up to about 24 hours may be advantageously employed.

Other factors contributing to the determination of a suitable contact time include the ammonia or ammonium salt concentration of the aqueous extracting solution, the temperature of the treating solution in contact with the spent catalyst, and the desired extent of metals recovery. Generally, the ammonium or ammonium salt solution is suitably employed in from about a 1 molar to about a 5 molar concentration. The method is operable at ambient temperatures although the temperature of the treating solution is preferably from about 125° to about 175° C. but below the boiling point thereof. Pressure is not considered to be an important variable and may be simply autogenous pressure or an imposed pressure to maintain the treating solution in a substantially liquid phase at elevated temperatures.

The nickel is recovered from the spent catalyst as a metal complex, e.g., a metal-amine complex, while the molybdenum and vanadium form ammonium salts of their oxy-acids, i.e. molybdates and vanadates. The metals are conveniently recovered in the form of oxides by concentration of the treating solution and decomposition of the metal complexes by methods widely practiced in the art.

The following example is presented in illustration of the method of this invention and is not intended as an undue limitation on the generally broad scope of the invention as set out in the appended claims.

A number of spent hydrorefining catalysts, each comprising vanadium, nickel and molybdenum on an alumina-silica base material, were treated according to the method of this invention. The spent catalysts were first heated in air at the conditions set out in Table I for the removal of carbonaceous and sulfurous matter. Thereafter, about a 10 gram sample of the catalyst was charged to a glass-lined rotatable autoclave and sealed therein together with 250 milliliters of a 3-molar aqueous ammonium carbonate solution. The autoclave was rotated and heated at 150° C. for a 1 hour period. Thereafter, the spent catalyst was recovered, dried and analyzed by X-ray fluorescence to determine the percent vanadium, nickel and molybdenum removed. In most instances, the extraction was repeated one or more times as indicated. The data obtained in the treatment of five separate samples at various conditions is set out in Table I below.

TABLE I

| | Carbon burn-off time | | Metals content, weight percent | | | Extraction number | Metals recovery, percent | | |
|---|---|---|---|---|---|---|---|---|---|
| | Hours | Temperature, °C. | V | Ni | Mo | | V | Ni | Mo |
| Catalyst No.: | | | | | | | | | |
| 1 | 1 | 500 | 5.5 | 1.2 | 11.5 | 1 | 92 | 53 | 799 |
| 2 | 1 | 550 | 4.7 | 1.7 | 10.1 | 1 | 86 | 50 | 99 |
| | | | | | | 2 | 90 | 63 | 99 |
| 3 | 3 | 650 | 6.5 | 1.3 | 11.0 | 1 | 69 | 45 | 90 |
| | | | | | | 2 | 78 | 46 | 94 |
| | | | | | | 3 | 81 | 58 | 98 |
| 4 | 4 | 750 | 5.3 | 1.1 | 10.6 | 1 | 42 | 50 | 88 |
| | | | | | | 2 | 47 | 57 | 90 |
| | | | | | | 3 | 53 | 58 | 99 |
| 5 | 2 | 1,000 | 6.5 | 1.2 | 11.7 | 1 | 78 | 73 | 98 |
| | | | | | | 2 | 80 | 74 | 98 |

I claim as my invention:

1. A method for the recovery of metals selected from the group consisting of molybdenum, tungsten, nickel, cobalt and vanadium from a spent catalyst comprising said metals and carbonaceous matter deposited on alumina, which method comprises contacting said catalyst with an oxygen-containing gas at a temperature less than about 650° C. to burn the carbonaceous matter therefrom, thereafter maintaining said catalyst in contact with an aqueous solution of a treating agent selected from the group consisting of ammonia and a soluble ammonium salt of a weak acid at a temperature below the boiling point of said solution, separating said solution and recovering the soluble metal compounds extracted therein.

2. The method of claim 1 further characterized in that said treating agent is ammonium carbonate.

3. The method of claim 2 further characterized in that said aqueous ammonium carbonate solution is maintained in contact with said catalyst for a period of at least about 30 minutes at a temperature of from about 125° C. to about 175° C. and at a pressure to maintain substantially liquid phase conditions.

References Cited

UNITED STATES PATENTS

| | | | |
|---|---|---|---|
| 2,616,781 | 11/1952 | Forward | 75—103 |
| 3,141,765 | 7/1964 | Brown et al. | 75—103 |

FOREIGN PATENTS

| | | | |
|---|---|---|---|
| 660,298 | 5/1938 | Germany | 75—103 |

HYLAND BIZOT, Primary Examiner

E. L. WEISE, Assistant Examiner